United States Patent [19]
Vezain et al.

[11] Patent Number: 5,859,731
[45] Date of Patent: Jan. 12, 1999

[54] DEVICE FOR THE SUSPENSION AND TRANSLATIONAL GUIDANCE OF AN ITEM OF APPARATUS AND ITEM OF APPARATUS EQUIPPED WITH SUCH A DEVICE

[75] Inventors: Gérard Vezain, Mandelieu; Silvain Legrand, Nice, both of France

[73] Assignee: Aerospatiale Societe Nationale Industrielle, Paris, France

[21] Appl. No.: 895,022

[22] Filed: Jul. 16, 1997

[30] Foreign Application Priority Data

Jul. 16, 1996 [FR] France ................................. 96 08848

[51] Int. Cl.$^6$ ...................................................... G02B 7/02
[52] U.S. Cl. ......................................... 359/819; 359/822
[58] Field of Search ..................... 359/811, 819, 359/821, 822, 823

[56] References Cited

U.S. PATENT DOCUMENTS

| | | | |
|---|---|---|---|
| 4,209,233 | 6/1980 | Eisler | 359/391 |
| 4,961,637 | 10/1990 | Ou | 359/819 |
| 5,071,254 | 12/1991 | Vezain | 359/819 |
| 5,450,175 | 9/1995 | Sato et al. | 355/243 |
| 5,497,272 | 3/1996 | Wun | 359/821 |
| 5,737,135 | 4/1998 | Chan | 359/822 |

FOREIGN PATENT DOCUMENTS 0403354  12/1990  European Pat. Off. .

OTHER PUBLICATIONS

Patent Abstracts of Japan, vol. 018, No. 409, (P–1779), Jul. 29, 1994.

*Primary Examiner*—Georgia Epps
*Assistant Examiner*—Ricky Mack
*Attorney, Agent, or Firm*—Fisher, Christen & Sabol

[57] ABSTRACT

The present invention relates to a device for the suspension and translational guidance of an item of apparatus (1) intended to be displaced, parallel to its longitudinal axis (X—X) with respect to a stationary support (2), having one pair of suspension elements (4A, 4B) spaced along said longitudinal axis (X—X) while being flexible parallel to said axis, and controllable actuating means (10) intended to exert a force parallel to said axis (X—X) on said suspension elements.

According to the invention, each of said suspension elements (4A, 4B) consists of at least one pair of blades (5A, 5B, 6A, 6B), one end of one of said blades being secured to said support (2) and one end of the other of said blades being secured to said item of apparatus (1), the other ends of said blades being secured to each other.

10 Claims, 5 Drawing Sheets

DEVICE FOR THE SUSPENSION AND TRANSLATIONAL GUIDANCE OF AN ITEM OF APPARATUS AND ITEM OF APPARATUS EQUIPPED WITH SUCH A DEVICE

BACKGROUND OF THE INVENTION

The present invention relates to a device for the suspension and translational guidance of an item of apparatus intended to be displaced, parallel to its longitudinal axis (X—X) with respect to a stationary support, as well as to such an item of apparatus which is equipped with said device.

Although not exclusively, such a device is more particularly appropriate for being used for displacing an item of apparatus which itself forms part of an optical instrument in which it is necessary, for example, to displace one or more lenses with a view to achieving optimum adjustment, it being necessary for this displacement to be performed accurately in the direction of the optical axis of the lens or lenses concerned, without any offcentering or angular offset.

There is already known, from patent FR-2 648 241 in the name of the same applicant company, a device for the suspension and translational guidance of an item of apparatus intended to be displaced, parallel to its longitudinal axis (X—X) with respect to a stationary support, of the type having at least one pair of suspension elements spaced along said longitudinal axis (X—X) and arranged at least roughly transversely to said axis (X—X) while being flexible parallel to said axis (X—X), one end of each of said suspension elements being secured to said item of apparatus and another end of each of said suspension elements being secured to said support, and controllable actuating means intended to exert a force parallel to said longitudinal axis (X—X) on said suspension elements.

However, in this case, each suspension element consists of a single flexible blade which means that when a force is exerted parallel to the longitudinal axis (X—X) on the assembly formed by these two blades, there is a risk of said axis and therefore the optical axis of the lens or lenses concerned being offcentered.

The aim of the present invention is to overcome this drawback.

SUMMARY OF THE INVENTION

Thus the device for suspension and translational guidance of the type indicated hereinabove is noteworthy in accordance with the invention in that each of said suspension elements consists of at least one pair of blades, one end of one of said blades being secured to said support and one end of the other of said blades being secured to said item of apparatus, the other ends of said blades being secured to each other.

Thus, by using such a "double-bladed" design of each of the suspension elements, applying a force along the longitudinal axis (X—X) leads to deformation of the blades, as will be described in detail later and to "offcentering" with, however, no effect on the "position" of the axis (X—X) because this "offcentering" in fact affects the upper ("free") ends of the blades.

According to another feature of the invention, for each pair of blades of each suspension element, one of said blades is in the form of two branches, the lower end of each of which is fixed to said support while the lower end of the other of said blades, which is made as a single piece, is fixed to the end of a lug secured to said item of apparatus.

In addition, the lower end of each of said branches may be built into a respective foot attached to said support, while the branches of said first blades may be connected at their upper ends by a transverse blade securing these upper ends to each other, and securing them to the upper end of said second blades.

However, in this solution, the flexibility of the blades may, for a non-zero travel of the actuating means, lead to offcentering under the effect of gravity, which means that it is advantageous, according to an alternative form of the invention, for each of said suspension elements to consist of two pairs of said blades arranged symmetrically with respect to the longitudinal mid-plane of the assembly formed by the two said pairs of blades when the actuating means are in the rest condition, and for the upper ends, which are secured to each other, of each pair of blades of said assembly to be connected by a securing element which works in tension/compression.

As a preference, said securing element consists of two blades, the width of which runs parallel to the axis (X—X) connecting the upper and lower ends, respectively, of said transverse blades, thus forming a "hollow section or beam" structure with a quadrilateral-shaped cross section.

According to another feature of the invention, each suspension element has the overall shape of an inverted W when said actuating means are in the rest condition.

Furthermore, each outer branch of the suspension element which is in the shape of an inverted W is built into a respective foot attached to said support, while the inner branches are fixed, both together, to the end of a lug secured to said item of apparatus.

According to yet another feature of the invention, the point at which the force exerted by said actuating means is applied to the elastic blades is at least roughly along the axis (X—X) so that if (L) is the distance separating the built-in upper and lower ends of said blades, the axis (X—X) is situated in such a way that the distance separating the built-in upper ends from the axis (X—X) is at least roughly equal to the distance separating the built-in lower ends from said axis, namely to (L/2).

BRIEF DESCRIPTION OF THE DRAWINGS

The figures of the appended drawing will make it easier to understand how the invention may be achieved. In these figures, identical references denote similar elements.

DETAILED DESCRIPTION OF THE DRAWINGS

Figure 1:
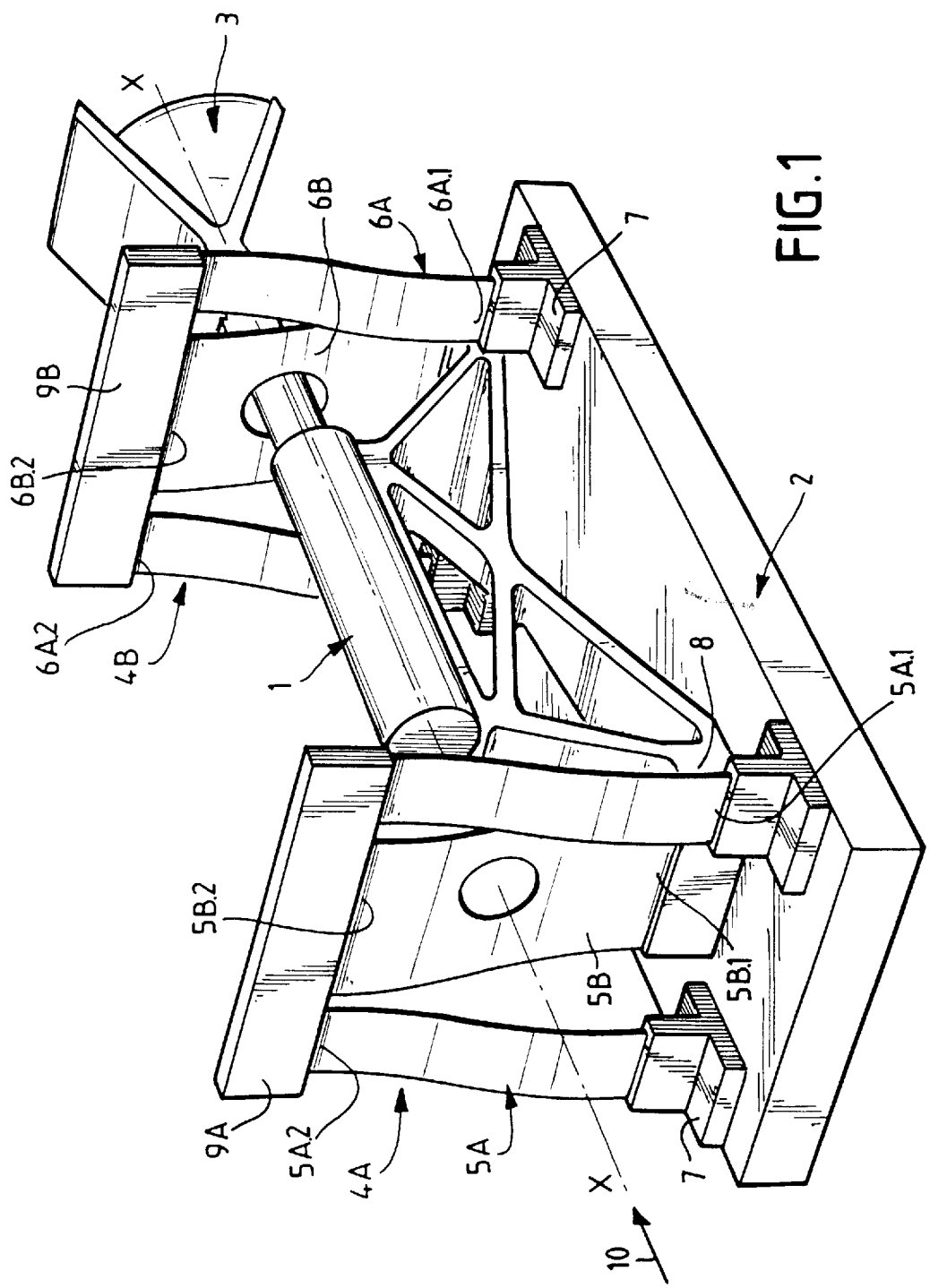
FIG. 1 is a perspective view of a first embodiment of the device for suspension and translational guidance according to the invention, for an item of apparatus intended to be displaced along its longitudinal axis (X—X).
Figure 2:
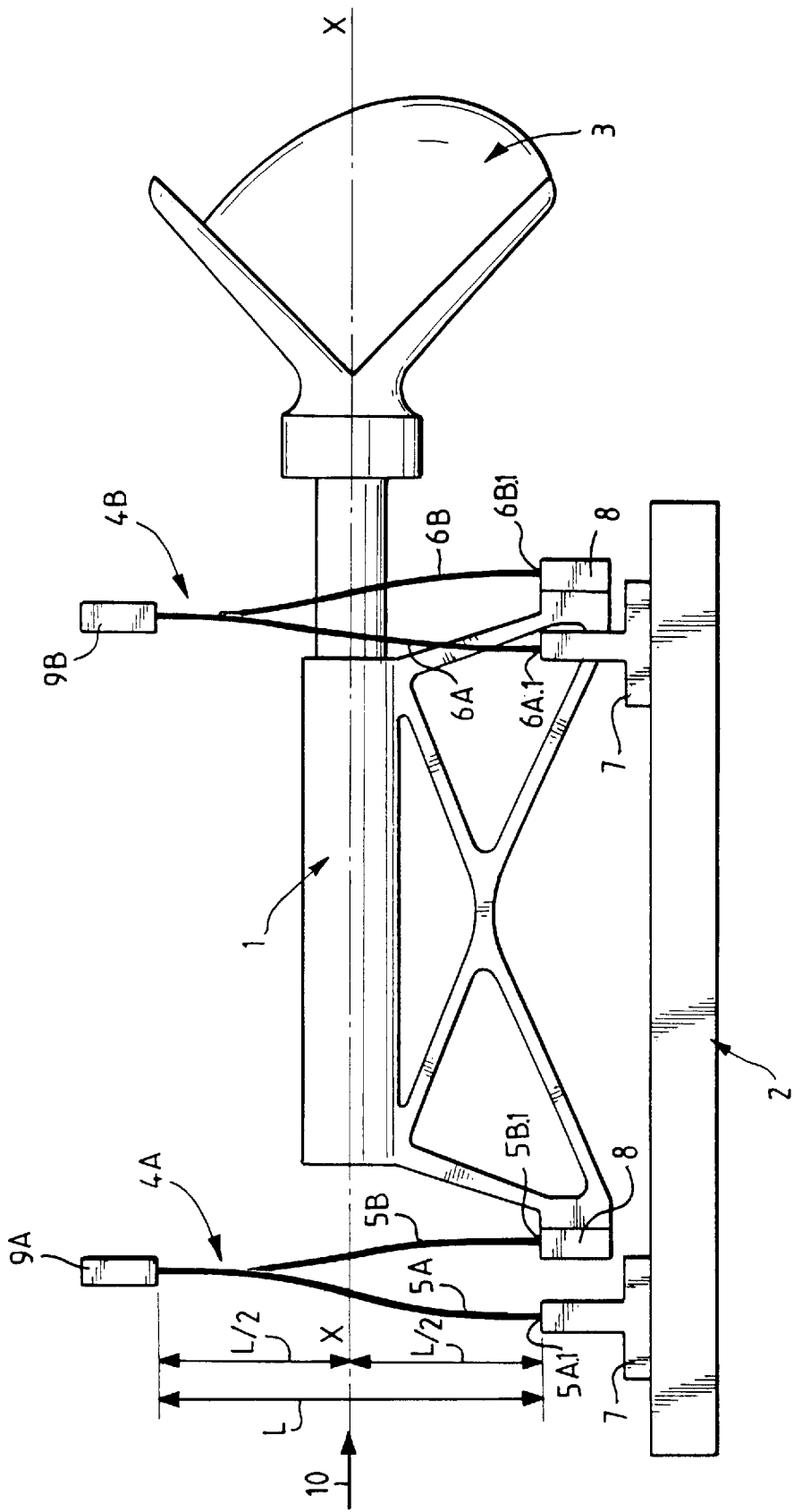
FIG. 2 is a side view of the device of FIG. 1.

As may be seen in FIGS. 1 and 2 in particular, the device for the suspension and translational guidance of an item of apparatus 1 intended to be displaced, parallel to its longitudinal axis (X—X) with respect to a stationary support 2 and capable of carrying, at 3, an optical instrument (not represented), has a pair of suspension elements 4A, 4B. The suspension elements 4A, 4B are spaced apart along the longitudinal axis (X—X) and arranged at least roughly transversely to said axis (X—X) while being flexible parallel to said axis (X—X). According to the invention, in this first embodiment, each suspension element 4A, 4B consists of a pair of blades 5A, 5B; 6A, 6B, in which one end of one of said blades (5A, 6A, respectively) is secured to the support 2 and one end of the other of said blades (5B, 6B, respectively) is secured to the item of apparatus 1, the other ends of the blades 5A, 5B; 6A, 6B being secured to each other.

More specifically, as can be seen in FIG. 1, the blades 5A, 6A are each in the form of two branches, the lower end 5A.1, 6A.1 of each of which is fixed to the support 2 by being, for example, built into a respective foot 7 attached to the support 2, while the lower end 5B.1, 6B.1 of the blades 5B, 6B, which are as a single piece, is built into the end of a respective lug 8 secured to the item of apparatus 1.

Furthermore the branches of the blades 5A, 6A are connected, at their upper ends 5A.2, 6A.2, by a transverse blade 9A, 9B securing these upper ends together, as well as securing them to the upper end 5B.2, 6B.2 of the blades 5B, 6B.

In addition, as may be seen in FIG. 2, the point at which the force exerted by the actuating means (merely represented by the arrow 10 in the drawing) is applied to the elastic blades has to be exerted along the axis (X—X) which means that if (L) is the distance separating the built-in upper and lower ends of the blades 5A, 5B; 6A, 6B, the axis (X—X) is situated in such a way that the distance separating the built-in upper ends from the axis (X—X) is at least roughly equal to the distance separating the built-in lower ends from the axis (X—X), namely to (L/2); this being so as to obtain a zero angular offset when the force is applied.

Figure 3:
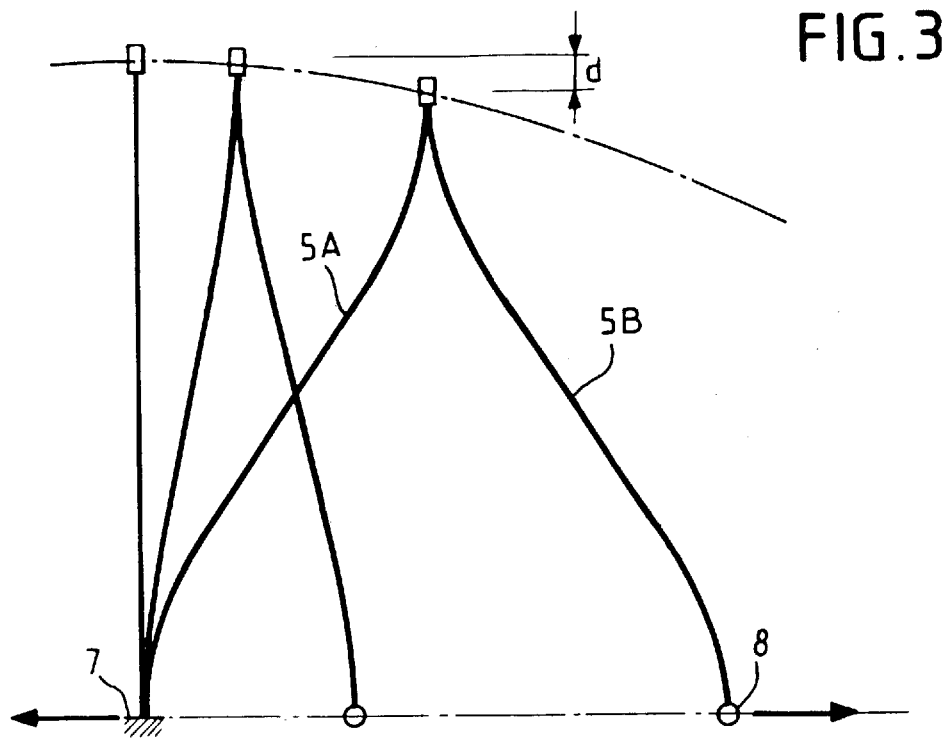
FIG. 3 illustrates the deformation of the blades of a suspension element of the device of FIGS. 1 and 2, under the action of a force exerted parallel to the axis (X—X).

As can be seen in FIG. 3, applying a force along the longitudinal axis (X—X) effectively leads to a deformation of the blades 5A, 5B; 6A, 6B and to an offcentering d, but one which does not affect the axis (X—X) because the offcentering d affects the "free" (upper) ends of the blades.

However, as already mentioned, although for zero travel of the actuating means the assembly is very rigid in the gravity direction (generally vertically) because the blades are then working in tension/compression, once travel has begun, said stiffness tends to fall away rapidly and lead to offcentering which may prove substantial under the effect of gravity. This flexibility under the effect of gravity for non-zero travel may also have repercussions on the angular offset.

In order to avoid these drawbacks, an embodiment of the device for suspension and translational guidance has been designed, and illustrated in FIGS. 4 to 8, which is in any case similar to the previous embodiment, but is one in which each of the suspension elements 4A, 4B consists of two pairs of blades 5A, 5B; 6A, 6B described earlier, arranged symmetrically (or in opposition) with respect to the longitudinal mid-plane of the assembly formed by the two said pairs of blades when the actuating means 10 are in the rest condition, and in which the upper ends, which are secured to each other, of each pair of blades 5A, 5B; 5A, 5B on the one hand, and 6A, 6B; 6A, 6B on the other hand, are connected by a securing element 11 which works in tension/compression and consists of two blades 11A, 11B, the width of which runs parallel to the axis (X—X), connecting the upper and lower ends, respectively, of the transverse blades 9A, 9B. Thus a "hollow section or beam" structure with quadrilateral cross section is obtained and this gives the respective suspension element 4A, 4B very high stiffness along the axis of gravity, this stiffness being practically constant irrespective of the travel of the actuating means 10. It should, however, be noted that the presence of the blades 11A, 11B may lead to slight offcentering (and possibly to a slight angular offset) but which remains very low: for example less than 2 micrometers for a travel of ±10 mm.

Figure 5:
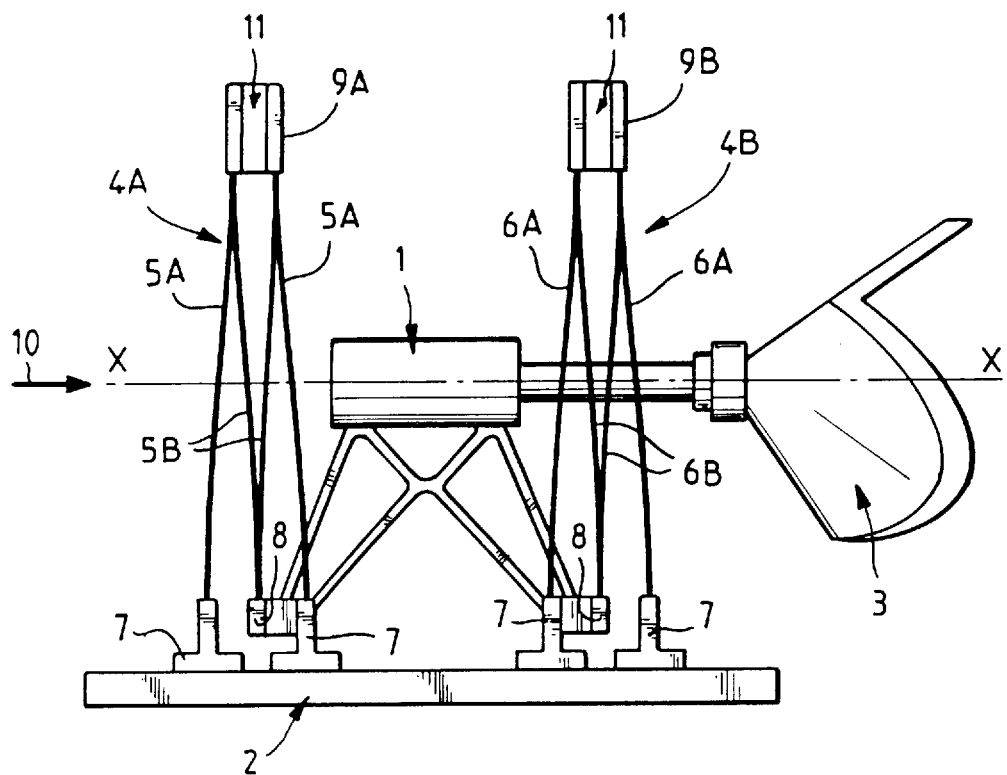
FIG. 5 is a side view of the device of FIG. 4.

An can best be seen in FIG. 5, each suspension element 4A, 4B, when the actuating means 10 are in the rest condition, has the overall shape of an inverted W, each "outer" branch of which is built into a respective foot 7 attached to the support 2, while the "inner" branches are fixed, both together, to the end of a lug 8 secured to the item of apparatus 1. It will additionally be noted that as in the previous embodiment, the blades have lengths and are built in at positions which are such that the point at which the force is exerted by the actuating means 10 remains "central".

Figure 8:
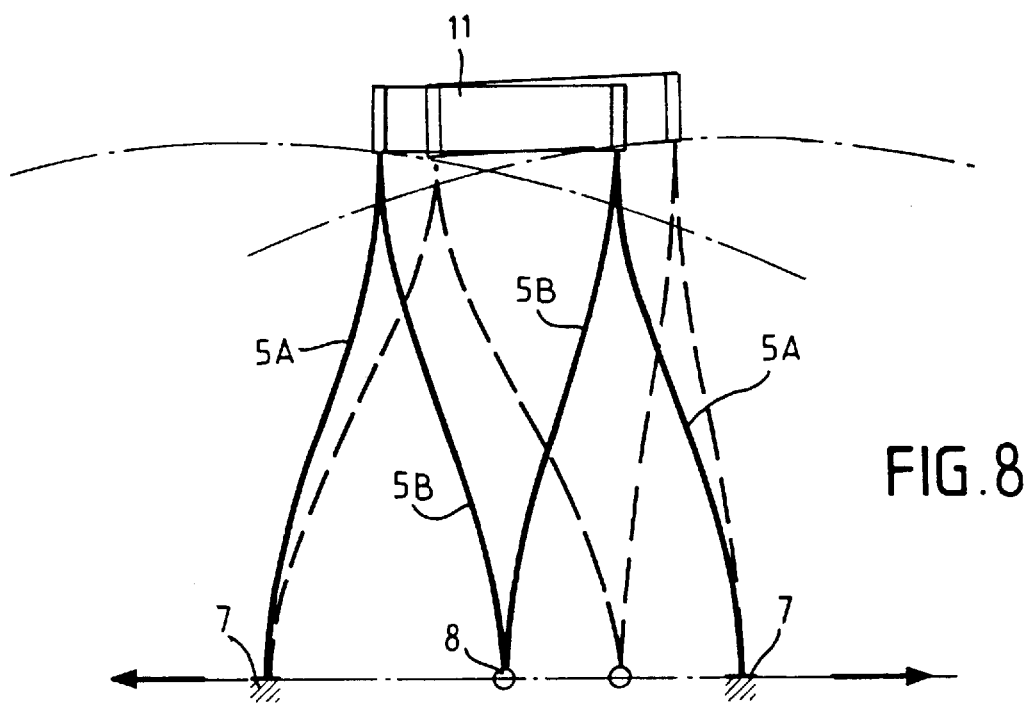
FIG. 8 shows the deformation of the blades of a suspension element of the device of FIGS. 4 and 5 under the action of a force exerted parallel to the axis (X—X).
Figure 4:
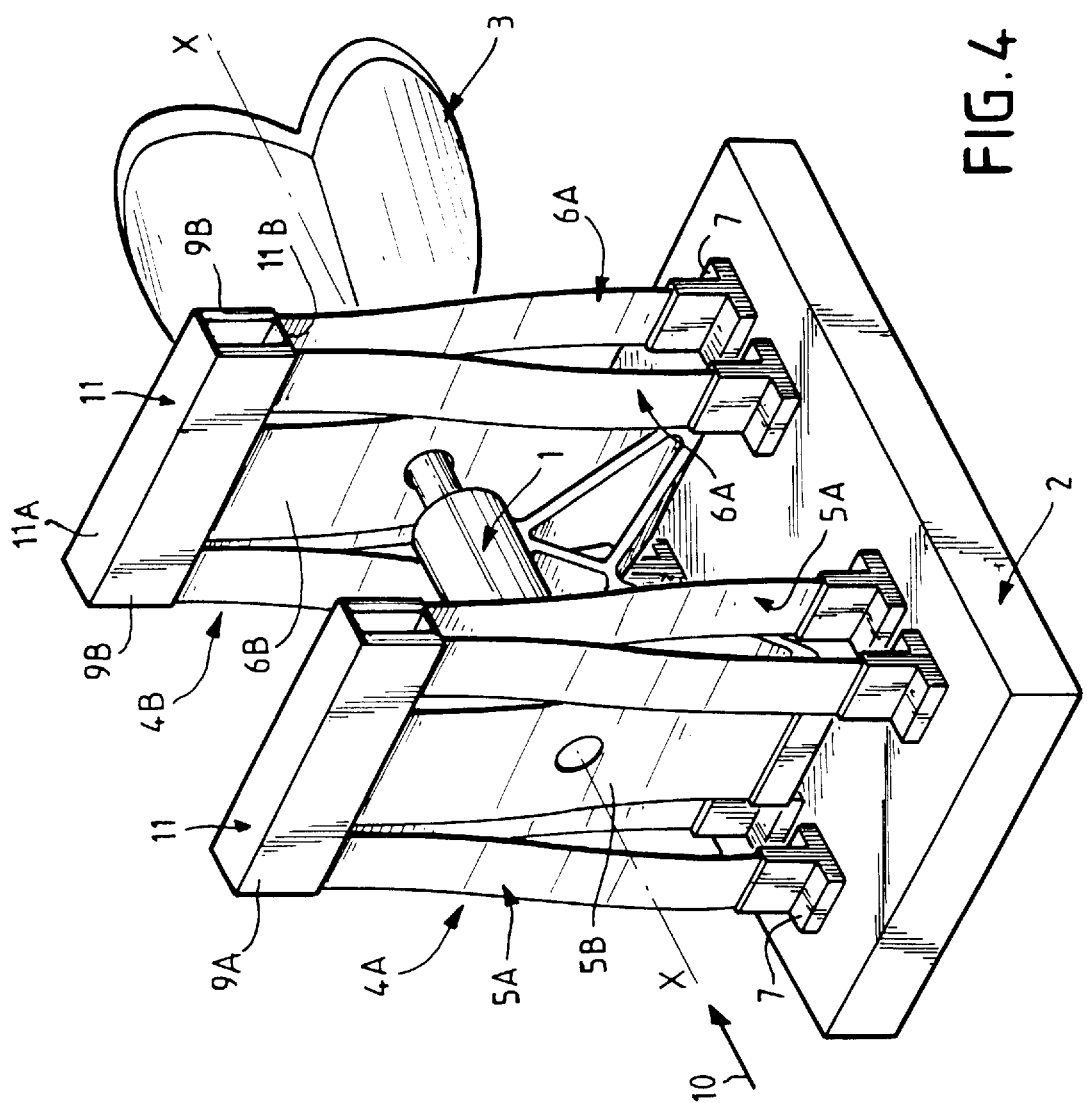
FIG. 4 is a perspective view of a second embodiment of the device for suspension and translational guidance according to the invention.
Figures 6, 7:
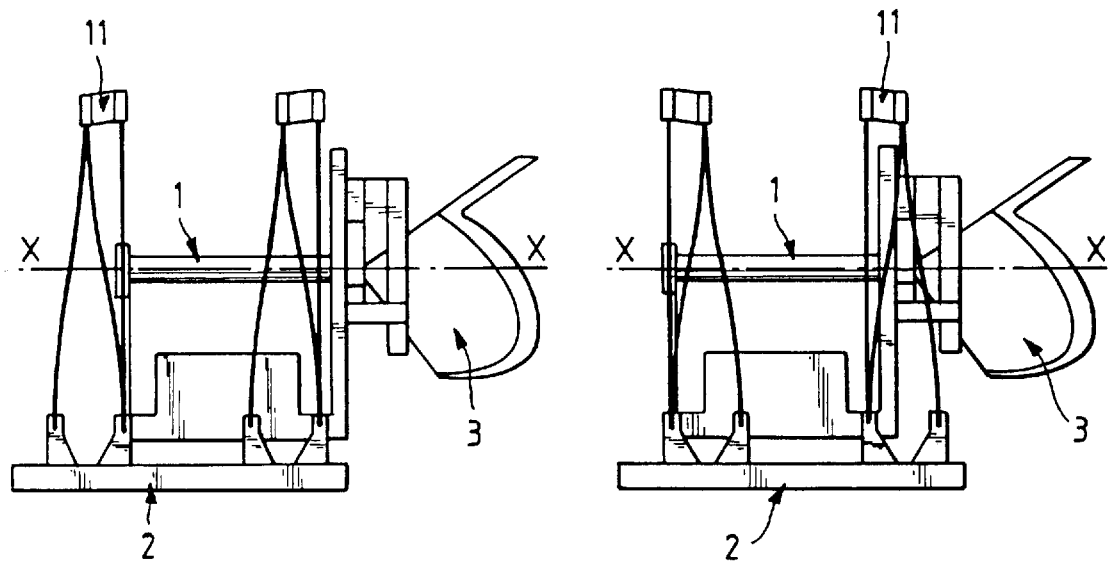
FIGS. 6 and 7 illustrate the deformation of the device, in the case of the example of FIGS. 4 and 5, for a displacement of the item of apparatus along the axis (X—X) in both directions.

FIGS. 6 to 8 illustrate deformations of the blades 5A, 5B; 6A, 6B for various travels of the item of apparatus 1 along the axis (X—X).

We claim:

1. A device for the suspension and translational guidance of an item of apparatus (1) intended to be displaced, parallel to its longitudinal axis (X—X) with respect to a stationary support (2), of the type having at least one pair of suspension elements (4A, 4B) spaced along said longitudinal axis (X—X) and arranged at least approximately transverse to said axis (X—X) while being flexible parallel to said axis (X—X), one end of each of said suspension elements being secured to said item of apparatus (1) and another end of each of said suspension elements being secured to said support (2), and controllable actuating means (10) intended to exert a force parallel to said longitudinal axis (X—X) on said suspension elements, wherein each of said suspension elements (4A, 4B) consists of at least one pair of blades (5A, 5B; 6A, 6B), one end of one of said blades being secured to said support (2) and one end of the other of said blades being secured to said item of apparatus (1), the other ends of said blades being secured to each other.

2. The device as claimed in claim 1, wherein for each pair of blades of each suspension element (4A, 4B), one of said blades (5A, 6A) is in the form of two branches, the lower end (5A.1, 6A.1) of each pair of blades is fixed to said support (2) while the lower end (5B.1, 6B.1) of the other of said blades (5B, 6B), which is made as a single piece, is fixed to the end of a lug (8) secured to said item of apparatus (1).

3. The device as claimed in claim 2, wherein the lower end (5A.1, 6A.1.) of each of said branches is built into a respective foot (7) attached to said support (2).

4. The device as claimed in claim 2, wherein the branches of said first blades (5A, 6A) are connected at their upper ends (5A.2, 6A.2) by a transverse blade (9A, 9B) securing these upper ends to each other, and securing them to the upper end (5B.2, 6B.2) of said second blades (5B, 6B).

5. The device as claimed in claim 1, wherein each of said suspension elements (4A, 4B) consists of two pairs of said blades (5A, 5B; 6A, 6B) arranged symmetrically with respect to the longitudinal mid-plane of the assembly formed by the two said pairs of blades when the actuating means (10) are in the rest condition, and wherein the upper ends, which are secured to each other, of each pair of blades of said assembly are connected by a securing element (11) which works in tension/compression.

6. The device as claimed in claim 4, wherein said securing element (11) consists of two blades (11A, 11B), the width of which runs parallel to the axis (X—X) connecting the upper and lower ends, respectively, of said transverse blades (9A, 9B).

7. The device as claimed in claim 5, wherein each suspension element (4A, 4B) has the overall shape of an inverted W when said actuating means (10) are in the rest condition.

8. The device as claimed in claim 7, wherein each outer branch of the suspension element which is in the shape of an inverted W is built into a respective foot (7) attached to said support (2), while the inner branches are fixed, both together, to the end of a lug (8) secured to said item of apparatus (1).

9. The device as claimed in claim 1, wherein the point at which the force exerted by said actuating means (10) is applied to the elastic blades is at least roughly along the axis (X—X) so that if (L) is the distance separating the built-in upper and lower ends of said blades, the axis (X—X) is situated in such a way that the distance separating the built-in upper ends from the axis (X—X) is at least approximately equal to the distance separating the built-in lower ends from said axis, namely to (L/2).

10. An item of apparatus intended to be displaced, parallel to its longitudinal axis (X—X) with respect to a stationary support, which item of apparatus is equipped with a device for suspension and translational guidance as claimed in claim 1.

* * * * *